United States Patent [19]

Kerwin et al.

[11] 4,037,368

[45] July 26, 1977

[54] METHOD FOR DEFLASHING SMALL PARTS

[75] Inventors: William S. Kerwin, Minneapolis; John Rodney Nelson, Edina; Hans Robert Toll, St. Anthony Village, all of Minn.

[73] Assignee: Toll Cryogenics, Inc., Minneapolis, Minn.

[21] Appl. No.: 567,185

[22] Filed: Apr. 11, 1975

Related U.S. Application Data

[62] Division of Ser. No. 367,863, June 7, 1973, Pat. No. 3,909,988.

[51] Int. Cl.² .............................................. B24B 1/00
[52] U.S. Cl. ..................................................... 51/314
[58] Field of Search ............. 51/7, 163, 164, 313–316, 51/164.5; 259/56; 85/101, 16

[56] References Cited

U.S. PATENT DOCUMENTS

| | | | |
|---|---|---|---|
| 1,099,985 | 6/1914 | Lamb | 51/163 UX |
| 1,453,120 | 4/1923 | Beaver | 51/164.5 |
| 2,022,527 | 11/1935 | Schletz | 259/56 |
| 2,423,019 | 6/1947 | Haines | 51/163 |
| 2,881,571 | 4/1959 | Granata | 51/314 X |
| 2,912,803 | 11/1959 | Simjian | 51/316 |
| 3,093,940 | 6/1963 | Balz | 51/163 |
| 3,108,408 | 10/1963 | Dahlquist | 51/163 |
| 3,333,367 | 8/1967 | Salvaire | 51/314 X |

FOREIGN PATENT DOCUMENTS

| | | | |
|---|---|---|---|
| 663,581 | 12/1951 | United Kingdom | 51/163 |

*Primary Examiner*—Harold D. Whitehead
*Attorney, Agent, or Firm*—Merchant, Gould, Smith, Edell, Welter & Schmidt

[57] ABSTRACT

Apparatus for removal of flash from small molded plastic and rubber parts, including a specially configured cryogenic shaking vessel and support and drive means for imparting a reciprocating rotational movement thereto. In the preferred embodiment the generally elongated shaker vessel has rounded ends and bottom, and the vessel is oscillated about an axis perpendicular to the longitudinal axis of the vessel, so that a maximum mixing of the product and the deflashing media, which may be sharply pointed objects such as chrome plated tacks, occurs within the shaking vessel.

3 Claims, 6 Drawing Figures

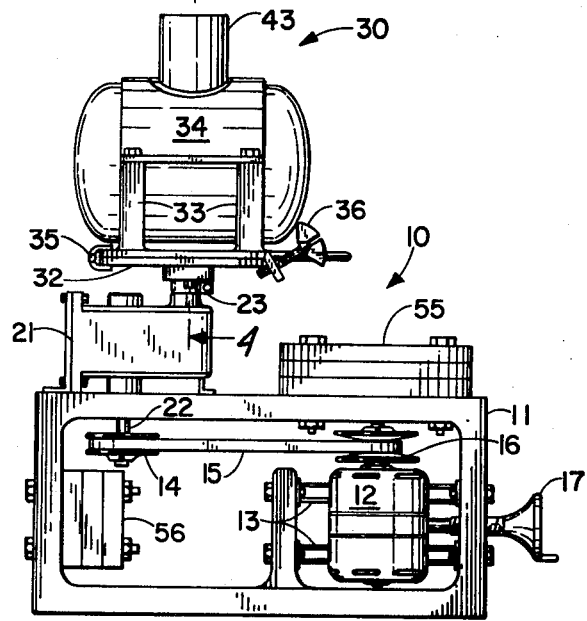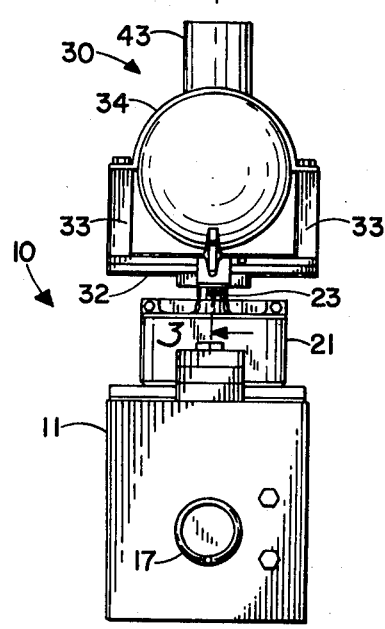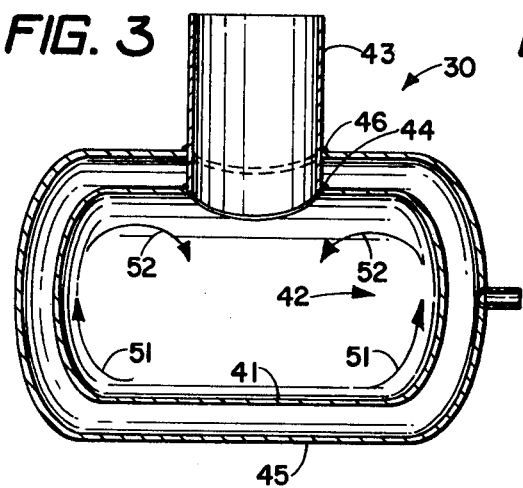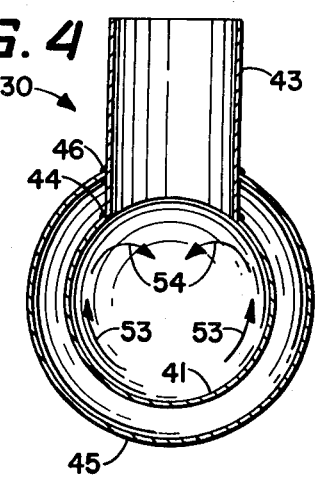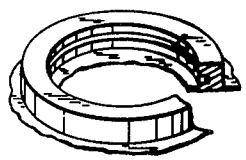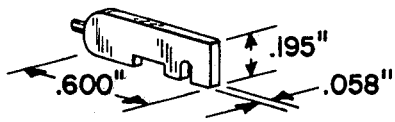

METHOD FOR DEFLASHING SMALL PARTS

This is a division of application Ser. No. 367,863, filed June 7, 1973, and now U.S. Pat. No. 3,909,988 issued Sept. 30, 1975.

BACKGROUND OF THE INVENTION

The present invention pertains generally to the field of apparatus for the removal of flash from molded parts. In particular, the present invention pertains to the removal of flash from miniature molded parts, which heretofore have not been satisfactorily economically deflashed.

The removal of flash, which is the unwanted, generally thin flange of molded material adherring to a molded part, resulting from the seeping of molten material between the faces of the mold during the molding process, has generally been performed in the prior art by an abrasive process. The parts are first cooled to the embrittlement temperature of the material from which the parts are made, and are then rotated in a tumbling machine, or shaken in a shaking machine together with the abrasive media. The flash, being of substantially less thickness than the rest of the part, is broken off by the impingement by the media particles, due to its embritted state. A wide range of media have been used in the prior art, including metal shot, sand and nails. While this prior art method has been successful with larger parts such as rubber hose fittings, it has not been successful in deflashing smaller rubber parts having dimensions of fractions of inches.

The deflashing problem has been complicated by the use of very hard and durable materials such as Delrin and glass filled nylon in molding small parts. Frequently, the molded parts are intended for use in close tolerance applications in which a very small amount of flash would render the parts unusable. In the computer industry, for example, small molded parts for use in computer assemblies may require that the flash be less than .0005 inches. In such cases, the prior art deflashing apparatus has been entirely unsuccessful, and it has been necessary for workers to deflash each individual part by hand with a razor blade, frequently with the aid of a microscope. Individual handling of many thousands of small parts obviously leads to a very significant labor cost, often many times the original cost of the part.

In the deflashing of relatively small parts, of any material, the prior art tumbling machines have not been very effective. Limited success has been achieved in the prior art through the use of a paint shaker type of machine. The product and media, which may be nails, walnut shells, metal shot, or the like, are placed inside a paint can or bucket which has been clamped into the shaker machine. While this prior art method has met with some limited success, it suffers from the disadvantages of requiring a relatively long shaking time, high breakage and damage rates to the product, and inability to produce uniformly close tolerances.

The present invention provides apparatus which uses a similar shaking motion, but with a specially configured shaking container so as to provide a special tossing and intermixing action of the product and media, resulting in operation and efficiency wich is vastly improved over the prior art. The present invention also provides a specially configured cryogenic vessel for use with the deflashing apparatus, which greatly improves efficiency when liquified gases are used to cool the product.

Another problem existing in the prior art is the rapid formation of rust on steel media in cryogenic deflashing processes. At the end of the process, moisture from the air condenses on the cold media particles, causing them to rust. This rusting can lead to discoloration of subsequently deflashed products, particularly in the case of white nylon parts, in which case it may be impossible or impractical to wash the discoloration off the product. This problem in the prior art has lead to the discarding of steel media for cryogenic deflashing after one use, and the attendant increased costs. According to another feature of the present invention, this rust problem is overcome, without foregoing one of the main advantages of steel or iron media, which is the capability of using magnetic separation of the media from the product. According to this aspect of the invention, chrome plated tacks are provided for deflashing the product. The chrome plated tacks are not subject to a rust problem, they retain their ability to be magnetically separated, and they have sufficient hardness to maintain a sharp point for deflashing the harder low embrittlement temperature products, and maintain their sharp point through many deflashing cycles.

SUMMARY OF THE INVENTION

The present invention overcomes the problems existing in the prior art by providing novel apparatus for the efficient removal of flash from small molded parts which has not heretofore been possible except by expensive and time consuming hand work of each part. According to the present invention large numbers of these small molded parts may be deflashed in only a few minutes time, with a great degree of control and uniformity so that residual flash is held to a very small tolerance, and with minimum danger of damaging the parts during the process.

According to one aspect of the invention there is provided a new and improved deflashing apparatus which imparts a reciprocating rotational motion to a vessel which contains the molded parts and the deflashing media. The shaker vessel is generally elongated in configuration, and is mounted on means which support it for rotation about an axis perpendicular to the longitudinal axis of the vessel. Drive means operably connected to the support means impart the reciprocating rotational motion thereto. The interior end portions of the vessel are generally rounded and free of sharp corners and edges. This end configuration in combination with the reciprocating rotational motion causes a unique tossing action of the product and media within the vessel which results in unique flow patterns and very efficient intermixing the deflashing within the vessel.

According to another aspect of the invention, a novel cryogenic vessel is provided for use in the deflashing process. The vessel comprises a generally elongated inner vessel and a similarly shaped outer vessel surrounding the inner vessel but spaced apart therefrom. A neck connects from an opening in the side of the inner container through an opening in the side of the outer container to provide access to the inner container for loading and unloading material, and also serves to provide the only point of support between the two containers for holding them in fixed relationship to each other. The chamber thus formed between the two containers is evacuated to provide vacuum insulation to prevent heat loss and improve efficiency when liquified gases are used to cool the molded parts to their embrittlement temperature.

According to yet another aspect of the present invention, efficient deflashing of small parts is accomplished through the use of sharply pointed chrome plated tacks sized commensurate with the size of the individual parts.

BRIEF DESCRIPTION OF THE DRAWINGS

In the drawing,

FIG. 1 is a view in side elevation of an embodiment of the deflashing apparatus according to the present invention;

FIG. 2 is a view in end elevation of the apparatus of FIG. 1;

FIG. 3 is an enlarged axial section along the line 3—3 of FIG. 2.

FIG. 4 is an enlarged transverse section along the line 4—4 of FIG. 1;

FIG. 6 is a view of a molded piece which can be successfully deflashed by the apparatus of FIGS. 1 and 2; and FIG. 5 is a view of another molded piece which can be successfully deflashed according to the present invention.

DESCRIPTION OF THE PREFERRED EMBODIMENT

In FIGS. 1 and 2, reference numeral 10 generally designates a deflashing apparatus according to the present invention. A frame 11 is provided for supporting the various elements of the apparatus. An electric motor 12 is mounted within frame 11 and secured thereto by sliding supports 13. Motor 12 drives a variable speed transmission which comprises pulley 14, V-belt 15 and variable pulley 16. A control wheel 17 attaches through a threaded shaft to motor 12. Rotation of control wheel 17 moves motor 12 along sliding supports 13, changing the distance from pulley 14 to pulley 16. Variable pulley 16 is spring-loaded and expands or contracts to alter its effective diameter in response to change in position of motor 12. Thus the effective drive ratio from motor 12 to pulley 14 is variably controlled by control wheel 17. Of course, any known type of variable speed transmission could be used.

Attached to the top of frame 11 by suitable means is reciprocating transmission 21. An input shaft 22 of transmission 21 is connected to pulley 14 of the variable speed transmission. Transmission 21 has an output shaft 23, which in the drawing is generally parallel to but offset from input shaft 22. Reciprocating transmission 21 provides at is output shaft 23, reciprocating rotational motion in response to an applied rotational input at shaft 22. In other words, shaft 23 undergoes alternate clockwise and counterclockwise rotation through a predetermined angle, in a manner similar to the motion of the agitator of a washing machine. The inner constructional details of a reciprocating transmission suitable for use in this invention are well known, and form no part of the present invention, as such. Accordingly, the interior details of transmission 21 are not shown.

A container 30 for holding the molded parts and media is supported for rotation by shaft 23. A base 32 is connected to output shaft 23 by a suitable coupling member. Saddle members 33 are attached to base 32 by any suitable means, and the upper portions thereof are contoured to receive the container 30. A bracket 34 is bolted to saddle members 33 and extends over the top of container 30 for holding it to the base. The bracket and saddle members thus serve to secure container 30 reciprocating rotation with shaft 23.

The base 32 is made up of an upper and lower portion which are hinged together along one edge by hinge 35. The lower portion of base 32 is connected to the output shaft 23, while the upper portion is connected to saddle member 33. The purpose of hinge 35 is to allow the container 30 to be dumped by pivoting it towards the left in FIG. 1. Pivoting container 30 about hinge 35 gives an end over end motion which is effective in dumping the media and product from the neck 43, at the end of the deflashing operation. For convenience, a screen or magnetic separator can be placed just to the left of the deflashing apparatus 10 of FIG. 1 for receiving the material dumped from the container. During the deflashing cycle, the base is held in place with the container in its upright position by tightening wing bolt 36 which is threaded through the upper portion of base 32. Weights 55 and 56 are bolted to frame 11 to dampen out vibrations. In one embodiment, a total of 700 pounds was added for this purpose.

In order to obtain good results, it is ordinarily necessary to cool the contents of the container to the embrittlement temperature of the material from which the parts have been molded. For many materials, this implies extremely low temperatures and the use of cryogenic materials such as liquid nitrogen. Accordingly, in order to increase efficiency a special cryogenic container has been provided. Container 30 of FIGS. 1 and 2 is shown in more detail in FIGS. 3 and 4.

Container 30 comprises an inner element 41, which is generally cylindrical in shape. The end portions 42 of inner element 41 are generally rounded or curved so that a smooth contour marks the transition from the cylindrical side portion to the end portion of the inner element, and sharp edges are avoided. A circular opening in the side of inner element 41 provides access for loading and unloading of the vessel. A cylindrical neck 43 fits around the opening and is welded to the inner element as indicated by reference numeral 44. Neck 43 is open at its top in the preferred embodiment, so that ongoing inspections can be easily made. However, in other embodiments, a lid or cap member can be provided for neck 43.

An outer element 45 having the same general configuration as inner element 41 is positioned therearound but is spaced apart therefrom. Outer element 45 is also generally cylindrical in shape, with generally curved end portions 46. However, outer element 45 has curved end portions for a different reason than inner element 41. In the case of the inner element, the rounded end portion is desirable in order to achieve smooth mixing and flow of the product and media mixture. In the case of the outer element, no such requirement exists, but the end portions may be curved if desired to provide additional strength, in view of the fact that the passageway or chamber formed between the inner and outer elements is evacuated. Outer element 45 also has an opening in its side, aligned with the opening in the side of inner element 41, through which neck 43 extends. Neck 43 is welded to outer element 45 around its circumference in contact therewith, as indicated by reference numeral 46. The chamber thus provided between inner element 41 and outer element 45 is completely sealed off by the welds around neck 43. This chamber may be evacuated, as through end plug 47, to provide a high degree of thermal insulation for the inner element. It will be appreciated that neck 43 in addition to providing the access opening, to the inner element, also provides the only mechanical support and spacing between the two elements.

In the preferred embodiment shown, the rotational reciprocating motion imparted to the container, coupled with the configuration of the container, results in patterns of flow of the product and media within the container as indicated by the flow arrows in FIGS. 3 and 4. It is believed that the fact that the container is somewhat elongated, and has generally rounded ends and bottom aids in this process. The ends of the container most distant from the axis of rotation are subject to higher amplitude oscillations and greater magnitudes of instantaneous accelerations then the central portions of the container. The product and media in the end portions therefore tend to be tossed about more violently, and rounded ends tend to toss the particles back towards the center. The flow patterns are generally from the center towards the ends as shown in FIG. 3, arrow 51, at which point they are tossed back towards the center as indicated by arrow 52. At the same time, superimposed upon the motion shown in FIG. 3, the particles tend to be moved from the inside toward the outside of the mass within the container, as shown by arrows 53 of FIG. 4, after which they are tossed by the sides of the container back towards the center as indicated by reference numerals 54. Of course the size and mass of the particles, both product and media, as well as the dimensions of the container, and the frequency and amplitude of the oscillations are all factors which go into determining the amount of mixing and tossing that takes place. Accordingly, the speed of oscillation is variable, as controlled by control wheel 17, so that adjustments in shaking frequency can easily be made to give optimum results with products of different size and density.

In the use of the deflashing apparatus according to the present invention, it is necessary to establish the control parameters of relative proportions of media and product, type of media, time, and temperature, for each different type of product to be deflashed. Ordinarily, these controls must be established by trial and error. However, some background experience with the apparatus will lead to the selection of starting points which are very close to optimum. It is only necessary then to make slight adjustments in one or more of the parameters to achieve optimum results. Nonetheless it is possible to establish certain general guidelines for optimum use of the apparatus.

For best results, the shaking container should be no more than half full of product and media, so that proper mixing action will result. A one-to-one ratio, based upon volume, of product to media gives a good starting point for experimentation, when the size of the individual molded pieces is approximately the same size as the media particles. However, if larger molded pieces are to be deflashed, then proportionately fewer parts should be used for media, perhaps as low as a one-to-three ratio of product to media, by volume. The foregoing ratios are based upon volume, not weight. The mass of the media will always exceed the mass of the product, since is generally used for the media. In a proper mixture, the products are "in solution" in the media to form a mixture that will mix fluidly when the apparatus is set into motion. The object is to get the proper ratio so that the mixing action described above with reference to FIGS. 3 and 4 is achieved. If too many parts are used, they tend to "float" on top of the media, and fail to be drawn down or sucked under the mass of media at center of the shaker. Once the apparatus is set into motion, visual inspection via neck 43 will reveal whether proper tossing and mixing action is taking place. If necessary, the ratio can then be adjusted.

In one successful embodiment of the deflashing apparatus according to the present invention, a cryogenic vessel having an inside diameter of six inches and a six quart capacity was used. Approximately one inch spacing was used between the inner and outer members, giving an outside diameter of approximately eight and $\frac{3}{8}$ inches, and an outside length of fourteen and $\frac{3}{8}$ inches. The design of reciprocating transmission resulted in oscillation of the shaking vessel through an angle of approximately 24°. The motor and variable speed transmission provided a variable frequency range from about 600 cycles per minute to about 1000 cycles per minute. Adjustment of the controlled parameters for successful deflashing of different types of molded products is illustrated by the following two examples.

EXAMPLE 1.

The product was a molded rubber ring having a diameter of approximately one inch, and a square cross section approximately one-eighth inch on each side. The inner face had a small groove. The rings had flash along both sides of one surface, as shown in FIG. 5. A volume of the product was placed in the container together with a large volume of media, which comprised 3/32 inch diameter of stainless steel shot. The contents of the vessel were cooled to embrittle the rubber product by injecting liquid nitrogen through the neck into the vessel. Power was applied to the motor and oscillations began. Observation of the interior of the vessel through the neck showed that some of the rings were bunching up in the center of the vessel and were not being pulled down into the mass of media for proper mixing. Some of the rings were removed from the vessel by reaching in the neck with tongs. After a few minutes a few minutes a few samples were removed for inspection, without stopping the machine. The sampling was repeated a few minutes later and revealed that the product had been satisfactorily deflashed. The contents of the vessel were dumped into a screen mesh for separation. Inspection revealed very little breakage, even though the rings were relatively thin for their large diameter. An oscillation speed of 600 cycles per minute was used for this product. Generally lower speeds are used for softer material such as rubber, and higher speeds are used for harder materials where greater acceleration forces are needed to toss the product when the vessel reverses directions.

EXAMPLE 2.

The product to be deflashed was a glass filled nylon molded plastic part, as shown in FIG. 6. It was required to reduce the flash to less than 0.0005 inches. The product was suspended in an approximate equal volume of media which comprised $\frac{3}{8}$ inch chrome plated tacks. The vessel was flooded with liquid nitrogen to cool the contents to the embrittlement temperature. Generally, exact temperature control has been found to be not as critical with this type of apparatus as it is with prior art tumbling machines. However, it is necessary to cool harder material such as glass filled nylon to lower temperatures than in the case of rubber. A oscillation frequency of close to 1000 cycles per minute was selected, and the apparatus was started. Samples were withdrawn from neck 43 with tongs at five minute intervals for inspection. After 20 minutes the required residual level of flash was attained, the machine was stopped, and the product was removed from the media by a magnetic separator.

The two above examples will illustrate the diversity of small molded parts that can be successfully deflashed, and the maner in which the operation parameters are adjusted for each item.

It will be appreciated that the chrome plated tacks according to the present invention can be used in prior art deflashing machines, in addition to the apparatus shown in FIGS. 1 and 2. In such applications, the advantages of the chrome plated tacks, namely the ability to deflash small items, the ability to retain a sharp point, the ability to be magnetically separated from the product, and the freedom from rust due to condensation from the air, are still maintained.

We claim:
1. The method of deflashing molded parts, comprising the steps of:
    a. placing a plurality of the parts to be deflashed in a generally elongated container having generally rounded ends;
    b. supporting the container with its longitudinal axis generally in a horizontal plane; and
    c. rotationally oscillating the container about a generally vertical axis.
2. The method according to claim 1 further including the additional step of placing deflashing media in the container.
3. The method of claim 1 further including the step of cooling the parts to their embrittlement temperature before imparting the motion to the container.

* * * * *

UNITED STATES PATENT AND TRADEMARK OFFICE
CERTIFICATE OF CORRECTION

PATENT NO. : 4,037,368
DATED : July 26, 1977
INVENTOR(S) : William S. Kerwin et al.

It is certified that error appears in the above-identified patent and that said Letters Patent are hereby corrected as shown below:

Column 1, line 64, the word "wich" should be changed to --which--.

Column 3, line 20, the number "6" should be --5--.

Column 3, line 23, the number "5" should be --6--.

Column 3, line 52, the word "is" should be --its--.

Column 4, line 2, the words "30 recip-" should be changed to --30 for recip---.

Column 5, line 2, the word "opening," should be changed to --opening--

Column 5, line 59, the words "for media" should be changed to --for the media--.

Column 5, lines 62 and 63, the words "since is" should be changed to --since metal is--.

Column 6, line 2, the words "at center" should be changed to --at the center--.

UNITED STATES PATENT AND TRADEMARK OFFICE
CERTIFICATE OF CORRECTION

PATENT NO. : 4,037,368
DATED : July 26, 1977
INVENTOR(S) : William S. Kerwin et al.

It is certified that error appears in the above-identified patent and that said Letters Patent are hereby corrected as shown below:

Column 6, line 40, the words "After a few minutes a few minutes" should be changed to --After a few minutes--.

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*